United States Patent
Anasenzl et al.

(10) Patent No.: US 12,403,550 B2
(45) Date of Patent: Sep. 2, 2025

(54) METHOD FOR PRODUCING A FUNCTIONAL STRUCTURE AND COMPONENT

(71) Applicant: Bayerische Motoren Werke Aktiengesellschaft, Munich (DE)

(72) Inventors: Manuel Anasenzl, Mainburg (DE); Thomas Forstner, Valley (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 17/396,251

(22) Filed: Aug. 6, 2021

(65) Prior Publication Data

US 2021/0362275 A1  Nov. 25, 2021

Related U.S. Application Data

(63) Continuation of application No. PCT/EP2020/051700, filed on Jan. 24, 2020.

(30) Foreign Application Priority Data

Feb. 8, 2019 (DE) ............ 10 2019 103 130.3

(51) Int. Cl.
| | |
|---|---|
| B23K 26/12 | (2014.01) |
| B23K 26/32 | (2014.01) |
| B23K 26/356 | (2014.01) |
| B23K 103/10 | (2006.01) |
| C21D 10/00 | (2006.01) |

(52) U.S. Cl.
CPC ........ *B23K 26/356* (2015.10); *B23K 26/1224* (2015.10); *B23K 26/125* (2013.01); *B23K 26/32* (2013.01); *C21D 10/005* (2013.01); *B23K 2103/10* (2018.08)

(58) Field of Classification Search
CPC .............................. B23K 26/082; C22F 1/04
See application file for complete search history.

(56) References Cited

U.S. PATENT DOCUMENTS

| | | | | |
|---|---|---|---|---|
| 4,972,061 A | * | 11/1990 | Duley ............ | C21D 1/09 |
| | | | | 427/586 |
| 2010/0197116 A1 | * | 8/2010 | Shah ............ | B23K 26/083 |
| | | | | 219/121.68 |

(Continued)

FOREIGN PATENT DOCUMENTS

| | | |
|---|---|---|
| CN | 106552997 A | 4/2017 |
| CN | 106715073 A | 5/2017 |

(Continued)

OTHER PUBLICATIONS

Translation of DE-19509497-C1 (Year: 1996).*

(Continued)

*Primary Examiner* — Elizabeth M Kerr
(74) *Attorney, Agent, or Firm* — Crowell & Moring LLP

(57) ABSTRACT

A method includes producing a functional structure on an aluminum surface with a local laser treatment of an aluminum surface. The local laser treatment is carried out with a pulsed laser system having a pulse duration of from 10 ns to 100 ns. The average power of the pulsed laser system is less than 5 kW.

14 Claims, 1 Drawing Sheet

(56) References Cited

U.S. PATENT DOCUMENTS

| | | | |
|---|---|---|---|
| 2011/0290915 A1* | 12/2011 | Sugiyama | B23K 26/0823 |
| | | | 219/121.64 |
| 2014/0349137 A1 | 11/2014 | Brandl et al. | |
| 2014/0356578 A1* | 12/2014 | Brandl | B23K 26/1224 |
| | | | 428/141 |
| 2015/0202712 A1 | 7/2015 | Seghi et al. | |
| 2016/0201184 A1 | 7/2016 | Seghi et al. | |
| 2016/0265570 A1 | 9/2016 | Sabau et al. | |
| 2017/0136668 A1 | 5/2017 | Kose et al. | |
| 2017/0291259 A1* | 10/2017 | Imoto | B23K 26/323 |
| 2018/0369956 A1 | 12/2018 | Anasenzl et al. | |

FOREIGN PATENT DOCUMENTS

| | | | |
|---|---|---|---|
| CN | 108367383 A | 8/2018 | |
| DE | 19509497 C1 * | 7/1996 | ............. B23K 26/40 |
| DE | 102009054394 A1 * | 5/2011 | ......... B23K 26/0006 |
| DE | 10 2011 121 545 A1 | 6/2013 | |
| DE | 10 2011 121 546 A1 | 6/2013 | |
| DE | 10 2015 000 179 A1 | 7/2016 | |
| EP | 1 854 903 A1 | 11/2007 | |
| EP | 2 669 041 A1 | 12/2013 | |
| EP | 3034224 A1 * | 6/2016 | ........... B23K 1/0012 |
| JP | 5-115990 A | 5/1993 | |
| JP | 2016129942 A * | 7/2016 | .......... B23K 26/324 |
| WO | WO 2007/142610 A1 | 12/2007 | |
| WO | WO 2015/172797 A1 | 11/2015 | |
| WO | WO 2018/188875 A1 | 10/2018 | |

OTHER PUBLICATIONS

Translation of DE-102009054394-A1 (Year: 2011).*
Translation of JP-2016129942-A (Year: 2016).*
International Search Report (PCT/ISA/210) issued in PCT Application No. PCT/EP2020/051700 dated Jun. 17, 2020 with English translation (five (5) pages).
German-language Written Opinion (PCT/ISA/237) issued in PCT Application No. PCT/EP2020/051700 dated Jun. 17, 2020 (five (5) pages).
German-language Search Report issued in German Application No. 10 2019 103 130.3 dated Nov. 14, 2019 with partial English translation (12 pages).
Heckert A., "Pulsed Laser Surface Pre-Treatment of Aluminium to Join Aluminium-Thermoplastic Hybrid Parts," Lasers in Manufacturing Conference (LiM) 2015 (12 pages).
Chinese Office Action issued in Chinese Application No. 202080006880.7 dated Feb. 7, 2022 (11 pages).

* cited by examiner

METHOD FOR PRODUCING A FUNCTIONAL STRUCTURE AND COMPONENT

CROSS REFERENCE TO RELATED APPLICATIONS

This application is a continuation of PCT International Application No. PCT/EP2020/051700, filed Jan. 24, 2020, which claims priority under 35 U.S.C. § 119 from German Patent Application No. 10 2019 103 130.3, filed Feb. 8, 2019, the entire disclosures of which are herein expressly incorporated by reference.

BACKGROUND AND SUMMARY OF THE INVENTION

The present disclosure relates to a method for producing a functional structure on an aluminum surface, to a component comprising a functional structure, and to a use of a pulsed laser system.

For the material connection of two cast aluminum components, for example, it is necessary to treat the surface of the components beforehand in order to achieve a sufficient strength of the joint connection in the subsequent joining process. To this end, inter alia, chemical processes are known from the prior art, for example chemical washing or pickling. Passivation of the surface and the provision of a cathodic dip coating or anodizing processes are also known in this context. Often, however, the known approaches are elaborate in terms of process technology and environmentally unfriendly, and entail high operating and maintenance costs. DE 10 2011 121 546 A1 therefore proposes a method for producing a metal or metal alloy surface or metal oxide or metal alloy oxide layer on a surface, operation being carried out with a pulsed laser system. It has, however, been found that although oxide layers may be produced or provided on aluminum surfaces with such laser systems, they are often for example insufficiently thick or not homogeneous enough to be suitable for a subsequent joining process. To this extent, the problem of operating or configuring the pulsed laser system in a suitable way exists.

It is therefore an object of the present disclosure to provide a method for producing a functional structure on an aluminum surface, a component comprising a functional structure, and a use of a pulsed laser system, which overcome the aforementioned disadvantages.

This object is achieved by a method according to an embodiment of the invention, a method for producing a functional structure on an aluminum surface comprises the step: at least local laser treatment of an aluminum surface in order to produce a functional structure on the aluminum surface or the aluminum alloy surface, wherein the laser treatment is carried out by means of a pulsed laser system having a pulse duration of 10-100 ns and wherein an average power of the laser system is less than 5 kW. Other features and advantages will be explained below with reference to the following figures, in which:

DETAILED DESCRIPTION OF THE DRAWINGS

Figure 1:
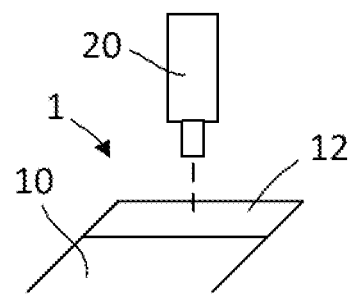
FIG. 1 is an aluminum surface during laser treatment to form a functional structure.
Figure 2:
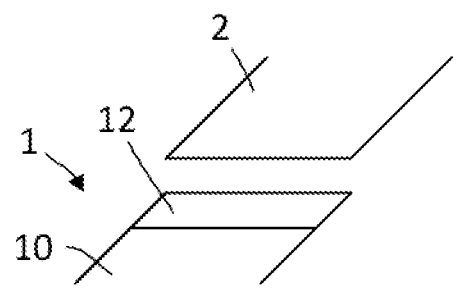
FIG. 2 is the component of FIG. 1 and a joining partner.
Figure 3:
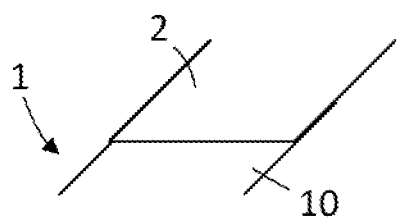
FIG. 3 is the component and the joining partner, cf. to FIG. 2, after joining via the functional structure.

Surprisingly, it has been found that the functional structure 12 produced in this way entails the formation of an optimal oxide layer. In this case, the oxide layer is in particular very homogeneous and much thicker than has been known. Thus, the thicknesses of oxide layers on AlMgSi alloys (without any laser treatment) is less than 3 nm. With the aforementioned laser treatment, thicknesses of more than 5 nm can be achieved. According to one preferred embodiment, the aforementioned surface is the surface of a component 1 made for example of an aluminum-magnesium (Al—Mg) alloy preferably an aluminum-magnesium-silicon alloy or an aluminum-magnesium-silicon-magnesium (Al—Mg—Si—Mg) alloy. One preferred material is, in particular, AlSi10MnMg. The component 1 is preferably a cast component 1, according to one embodiment for example a diecast component 1.

According to one embodiment, the method comprises the step:

material connection of the aluminum surface 10 to a joining partner 2 by means of the functional structure 12.

The joining partner 2 is not restricted in detail and may consist of any desired materials, in particular metal materials, for example steel or aluminum or a metal alloy. As an alternative, plastics or fiber composites may be used as a material for the joining partner 2.

According to one embodiment, the method comprises the step:

material connection by adhesive bonding, welding or soldering.

The method has been found to be particularly advantageous in combination with an adhesive bonding process. The adhesives conventionally used adhere particularly well on the laser-treated modified surface topology of the region to be joined, i.e. in particular the functional structure 12, of the aluminum surface 10.

Expediently, the functional structure 12 forms or comprises an oxide layer with a thickness in a range of about 5 nm to 700 nm, preferably from 5 nm to 200 nm. In other words, the method may also be referred to as a method for producing an oxide layer on an aluminum surface 10. By the laser treatment and the input of heat resulting therefrom, the surface is cleaned and modified in such a way that a very uniform oxide layer is formed thereon.

Particularly preferably, the laser system 20 has an average power of between 1 and 3 kW, or between 1 and 2 kW, or the laser treatment is carried out with this average power. The following method step has been found to be particularly advantageous in this case:

focusing the laser beam onto a diameter of about 500 to 3000 μm. Further preferred diameters lie in a range of about 900 to 1800 μm.

This, particularly with the aforementioned average powers, provides an optimal energy input which leads to the formation of the functional structure 12, or the oxide layer.

According to one embodiment, the method comprises the step:

laser treatment with a pulse duration of 20-40 ns.

This range has been found to be particularly advantageous in terms of the production of the functional structure 12. In this context, it should also be mentioned that a square beam shape is preferably used as the beam shape, although any other desired beam shapes may also be used. The square beam shape has, in particular, the advantage that in particular uniform processing without overlap regions is made possible when scanning with the laser. Particularly preferably, the laser treatment is carried out at the focal position and with a large Rayleigh length, preferred values for the Rayleigh length lying between 10 and 25 mm. The surface treatment may thus be made more robust, and is for example more tolerant in relation to focal position variations.

For the surface treatment, a wavelength of the laser system 20 of 1000-1100 nm has been found to be particularly advantageous since the pulse waves can thus be absorbed and converted very well by the aluminum material. The wavelength is particularly advantageously 1030 and 1064 nm.

Furthermore, the pulse frequency is advantageously 10-40 kHz, and in particular 10-30 kHz. In this way, the surface topology and surface tension of the cast aluminum component 1 to be joined are modified optimally with a reduced energy outlay, so that the adhesion to the joining partner 2 can be increased.

Advantageously, no chemical surface treatment steps are used. Correspondingly, the method advantageously comprises the step:

connection immediately after the laser treatment, or joining immediately after the laser treatment.

Advantageously, no further method or process steps are thus required after the laser treatment. This also applies in respect of any pretreatment before the laser treatment, which is likewise not necessary. In a particular case, however, it is readily possible to clean the surface to be treated beforehand, optionally even mechanically.

According to one embodiment, the method comprises the step:

laser treatment in an atmosphere, the atmosphere being a vacuum, an ambient atmosphere or an inert gas or gas mixture.

According to one embodiment, the aluminum surface 10 belongs to an aluminum component 1, in particular a cast aluminum component 1. The aluminum material used according to the method is not restricted in detail, so long as aluminum constitutes the main component in percent by mass, expressed in terms of the total weight of the component 1. Particularly advantageously, an aluminum content in the cast aluminum component 1 to be connected to the joining partner 2 is at least 70 percent by mass, expressed in terms of the total weight of the cast aluminum component 1.

The disclosure also relates to a component 1, in particular an aluminum component 1, in particular a cast aluminum component 1, comprising a functional structure 12 produced by the method according to the disclosure, wherein the functional structure 12 comprises an oxide layer having a thickness of about 5-700 nm. This entails optimal adhesive bonding and corrosion resistance. The functional structure 12, or laser-treated surface, provides any joining partners 2 with surface-active groups for bonding and is distinguished by an increased oxygen concentration. In particular, the oxide layer is extremely homogeneous and uniform. The uniformity of the oxide layer is distinguished by a "mirrored" component 1 surface in the laser-treated regions. Advantageously, the zone of fusion or zone of thermal influence into the surface, or into the component 1, is very small, for example up to at most 10 μm.

The disclosure furthermore relates to the use of a pulsed laser system 20 having a pulse duration of 10-100 ns and an average power of between 1 and 5 kW for producing a functional structure 12, or an oxide layer, on an aluminum surface 10, in particular of a cast aluminum component 1. The advantages and features explained in connection with the method or with the component 1 apply similarly and correspondingly for the use.

The laser system 20 used may for example comprise a beam source, a cooling device for the beam source, a guide fiber from the beam source to a scanner, and a scanner (for the beam deflection), in which case the scanner may be arranged on a mobile device, for example on a robot.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:
   producing a functional structure on an aluminum surface with a local laser treatment of an aluminum surface, wherein
   the local laser treatment is carried out with a pulsed laser system having a pulse duration of from 20 ns to 40 ns,
   an average power of the pulsed laser system is less than 5 kW,
   the functional structure comprises an oxide layer formed on the aluminum surface, the oxide layer having a thickness of from 60 nm to 700 nm,
   a wavelength of the laser system is between 1000 nm and 1100 nm,
   a zone of fusion or zone of thermal influence into the aluminum surface is at most 10 μm, and
   the pulsed laser is applied at a focal position and with a Rayleigh length lying between 10 and 25 mm.

2. The method according to claim 1, further comprising: forming a material connection between the aluminum surface and a joining partner, wherein the material connection is formed via the functional structure of the aluminum surface.

3. The method according to claim 2, wherein the material connection is formed by adhesive bonding, welding, or soldering.

4. The method according to claim 1, wherein the pulsed laser system has an average power of between 1 kW and 2 kW.

5. The method according to claim 4, further comprising: focusing the laser beam onto a diameter of from 500 μm to 3000 μm.

6. The method according to claim 1, further comprising: establishing the material connection after the local laser treatment.

7. The method according to claim 6, wherein the local laser treatment is applied in an atmosphere, the atmosphere being a vacuum, an ambient atmosphere, or an inert gas or gas mixture.

8. The method according to claim 7, wherein the aluminum surface belongs to a cast aluminum component.

9. The method according to claim 1, wherein a beam of the pulsed laser system has a square shape.

10. The method according to claim 1, further comprising: focusing the laser beam onto a diameter of from 900 μm to 1800 μm.

11. The method according to claim 1, wherein the wavelength of the laser system is between 1030 nm and 1064 nm.

12. A method for producing a functional structure comprising:

applying a laser with a pulsed laser system having a pulse duration of from 20 ns to 40 ns and an average power of between 1 kW and 5 KW, to thereby produce the functional structure on an aluminum surface, wherein the functional structure comprises an oxide layer formed on the aluminum surface, the oxide layer having a thickness of from 60 to 700 nm, and a wavelength of the laser system is between 1000 nm and 1100 nm, a zone of fusion or zone of thermal influence into the aluminum surface is at most 10 µm, and the pulsed laser is applied at a focal position and with a Rayleigh length lying between 10 and 25 mm.

13. The method according to claim 12, further comprising: focusing the laser beam onto a diameter of from 900 µm to 1800 µm.

14. The method according to claim 12, wherein the wavelength of the laser system is between 1030 nm and 1064 nm.

* * * * *